United States Patent [19]

Sakuma

[11] Patent Number: 4,758,059
[45] Date of Patent: Jul. 19, 1988

[54] POST-OBJECTIVE TYPE OPTICAL DEFLECTOR

[75] Inventor: Nobuo Sakuma, Inagi, Japan
[73] Assignee: Ricoh Company, Ltd., Tokyo, Japan
[21] Appl. No.: 814,543
[22] Filed: Dec. 30, 1985
[30] Foreign Application Priority Data Dec. 28, 1984 [JP] Japan ............................... 59-274324

[51] Int. Cl.$^4$ ............................................. G02B 26/10
[52] U.S. Cl. ....................................................... 350/6.8
[58] Field of Search ................................... 350/6.4–6.8

[56] References Cited

U.S. PATENT DOCUMENTS

| | | |
|---|---|---|
| 1,091,933 | 3/1914 | Humbrecht . |
| 3,045,545 | 7/1962 | Korones et al. . |
| 3,900,851 | 8/1975 | Bucy et al. . |
| 3,973,833 | 8/1976 | Lawson . |
| 4,179,183 | 12/1979 | Tateoka et al. . |
| 4,269,478 | 5/1981 | Maeda et al. . |
| 4,277,128 | 7/1981 | Kawamura . |
| 4,343,531 | 8/1982 | Tateoka et al. . |
| 4,353,617 | 10/1982 | Tokumitsu et al. . |
| 4,357,627 | 11/1982 | Johnson . |
| 4,390,235 | 6/1983 | Minoura . |
| 4,400,063 | 8/1983 | Hayashida . |
| 4,401,362 | 8/1983 | Maeda . |
| 4,436,383 | 3/1984 | Maeda . |
| 4,496,209 | 1/1983 | Itoh et al. . |
| 4,497,548 | 2/1985 | Burris . |
| 4,571,035 | 2/1986 | Sakuma . |
| 4,627,685 | 12/1986 | Sakuma ............................ 350/6.8 |

OTHER PUBLICATIONS

How To Select Acousto–Optic Modulators, Barry Grossman, Harris Corporation, Government Communications System Division.

Primary Examiner—John K. Corbin
Assistant Examiner—Loha Ben
Attorney, Agent, or Firm—Oblon, Fisher, Spivak, McClelland & Maier

[57] ABSTRACT

A post-objective type optical deflector, in which luminous fluxes are condensed by a convergent lens and thereafter deflected by a polygonal mirror, among apparatuses for scanning a laser beam, involves a problem in the deterioration of the curvature of field and the $f\theta$ characteristic. The deterioration of the curvature of field and the $f\theta$ characteristic may be corrected by forming a reflecting surface of a polygonal mirror into a convex surface or a convex cylindrical surface and adequately selecting the relationship between the distance A from the rotational center to the center of the reflecting surface, the radius of curvature R of the reflecting surface, the distance Lo from the deflection point of the polygonal mirror to the scanning surface, and the scanning width Yo.

1 Claim, 2 Drawing Sheets

FIG. 3a
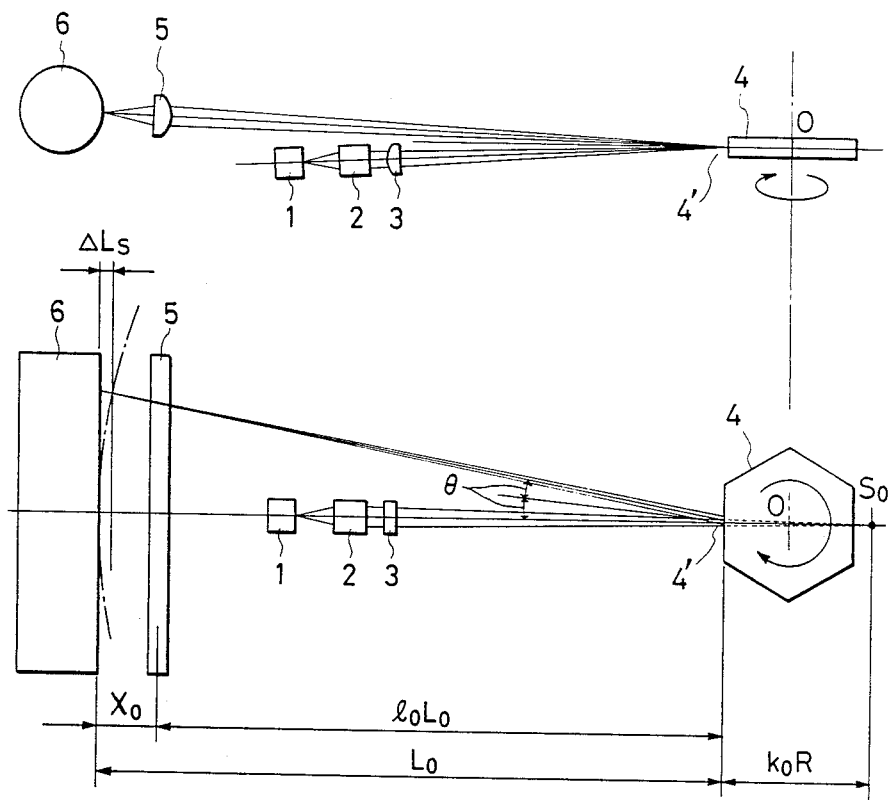
FIG. 3b
FIG. 4
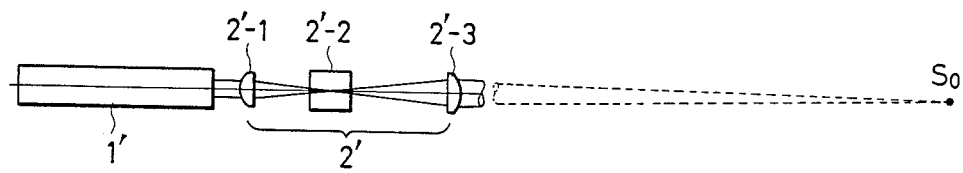

POST-OBJECTIVE TYPE OPTICAL DEFLECTOR

BACKGROUND OF THE INVENTION

1. Field of the Invention

This invention relates to a post-objective type optical deflection apparatus, and particularly to an objective type optical deflection apparatus using a polygonal mirror.

2. Description of the Prior Art

Among optical scanning apparatuses for the optical system used for a laser printer, a laser display and the like, a post-objective type deflection apparatus in which an optical deflector is arranged after the beam has been formed into a converging luminous flux by means of a convergent lens is designed so that the beam is subjected to converging action prior to deflection, and therefore a problem encountered in the convergent lens is only the axial image formation. The post-objective type deflection apparatus has an advantage in that the lens construction is simple. On the other hand, converging points are generally on a curved surface, and the apparatus is not suitable for plane-scanning required by the laser printer, the laser display and the like. In addition, even if the curvature of field is corrected by some kind of means, the image extends as it moves toward the scanning end, and the so-called $f\theta$ characteristic, which requires the proportional relation between the deflection angle and the scanning line, deteriorates. (It excessively increases toward a plus.) In the pre-objective type in which the convergent lens is arranged after deflection, the convergent lens has to be designed in the form of a wide angle enough to cover the deflection angle, which is liable to have the lens structure complicated. However, this concept can be used to facilitate correction of the curvature of field and the $f\theta$ characteristic. This is the reason why the pre-objective type is now principally used.

SUMMARY OF THE INVENTION

Incidentally, in the case where the post-objective type employs a galvanomirror as a deflector, the rotational angular velocity of the mirror decreases as it moves toward the scanning end, and once stops and then moves again. This decrease in velocity functions so as to negate the positively excessively large $f\theta$ characteristic. However, when the polygonal mirror is used in order to increase the scanning velocity, it will be difficult and undesirable to correct the $f\theta$ characteristic caused by variation in the scanning velocity.

It is therefore an object of this invention to provide a post-objective type optical deflection apparatus using a polygonal mirror which can correct the curvature of field and the $f\theta$ characteristic to the extent that is negligible in practical use.

FIG. 2 is a view for explanation of the principle of the invention. In this deflection apparatus, a deflector comprises a polygonal mirror composed of a spherical surface or a cylindrical surface with the center indicated at C, as shown in FIG. 1, and the mirror is rotated about an axis O.

The scanning luminous flux is incident so as to be converged at a point $S_o$, reflected at a point M on the mirror and focussed at a point S'. In the drawing, reference character $S'_o$ indicates the focus point when a deflection angle is $2\theta$, and $M_o$ indicates the reflection point at that time.

Let $L_o$ represent the distance between $S'_o$ and $M_o$, and L the distance between the point M and the foot of a perpendicular line projected from the point S' on the line passing through the points O and $S_o$, then we get $$L = (\cos 2\theta / \cos \theta) K'R$$

where R is the radius of curvature of the reflection surface, and K'R is the distance connecting the point M and the foot of a perpendicular line projected from the point S' on the line passing through the points M and C. Also let $K_o R$ represent the distance between $M_o$ and $S_o$, KR the distance connecting the point M and the foot of a perpendicular line projecting from the point $S_o$, then we get $$K = (K_o + \Delta) \cos \theta$$

where $\Delta \cdot R$ is the deviation $\overline{MM_o}$ of the reflection point caused by the rotation of the polygon.

From the image-forming relation of the differential luminous flux, $$K' = K \cos^2 \theta / (\cos^2 \theta - 2K)$$

After all, we get $$L = (K_o + \Delta) R \cos \theta \cos 2\theta / [\cos \theta - 2(k_o + \Delta)] \quad (1)$$

The condition that when the polygonal mirror is rotated about the axis O, the image distance $L + \Delta \cdot R$ when the rotational angle is $\alpha$ is equal to the image distance $L_o$ when $\alpha = 0$ is represented by $$L + \Delta \cdot R = L_o = K_o R / (1 - 2k_o) \quad (2)$$

$K_o$ is obtained by $$\Delta + \frac{(K_o + \Delta) \cos\theta \cos 2\theta}{\cos\theta - 2(k_o + \Delta)} = \frac{K_o}{1 - 2k_o} \quad (3)$$

If the space between the rotational center O and the center of the reflection surface, that is, the radius of an inscribed circle of the polygonal mirror is represented by A, we get $$\Delta = \cos\theta - 1 - \left(1 - \frac{A}{K}\right)(\cos\alpha - 1)$$

Established between the rotational angle $\alpha$ and the deflection angle $2\theta$ is $$\sin \theta = \left(1 - \frac{A}{R} \sin\alpha\right)$$

If the aforesaid condition is met, the curvature of field may be corrected but the $f\theta$ characteristic is positive and excessively increases.

To correct the $f\theta$ characteristic, that is, the deterioration of the evenness of the scanning velocity, there is employed, for example, a method for varying a clock of a signal output according to the variations in the scanning velocity, which has been put to practical use for the deflector which uses a galvanomirror.

However, in view of a limitation of the electrical correction as described above, it is desirable that the deviation in the $f\theta$ characteristic is within 15%.

It has been found from the result of simulation carried out with respect to the polygonal mirror in accordance with the present application that the condition required to maintain the deviation in the $f\theta$ characteristic within 15% is represented by $$\frac{A}{y_o} \leq 0.52 \left(\frac{R}{y_o}\right) \cdot \left(\frac{L_o}{y_o}\right) - 0.1708 \quad (4)$$

where $y_o$ represents the effective scanning width (the scanning range related to the evenness of the scanning).

BRIEF DESCRIPTION OF THE DRAWING

FIG. 3 illustrates an optical arrangement of one embodiment; and

FIG. 4 illustrates an optical arrangement of a reference example where a different light source is used.

DETAILED DESCRIPTION OF THE PREFERRED EMBODIMENT

Figure 1:
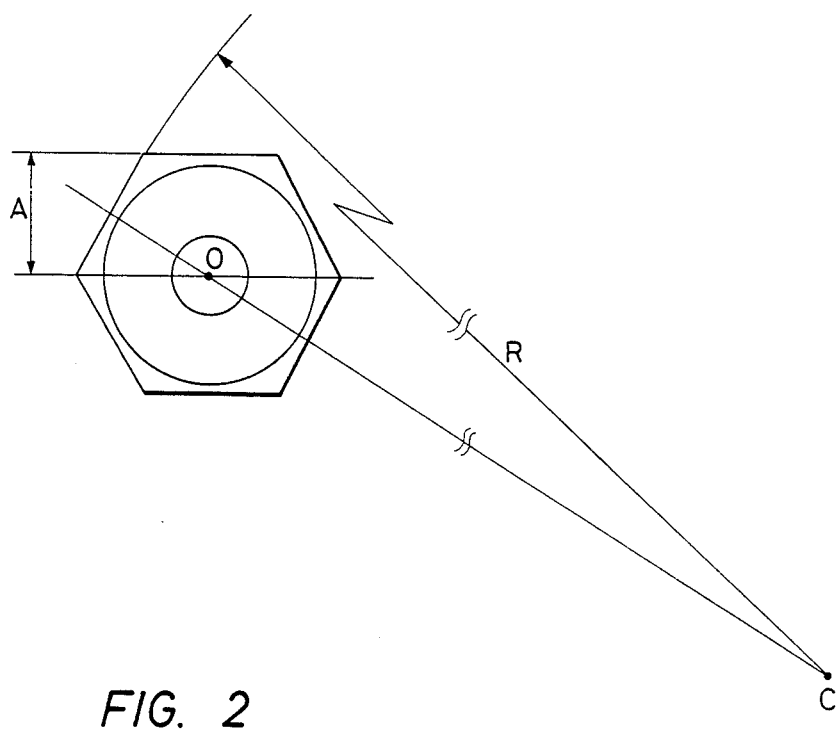
FIG. 1 is a plan view of a polygonal mirror which is a deflector in the optical deflection apparatus in accordance with the present invention.
Figure 2:
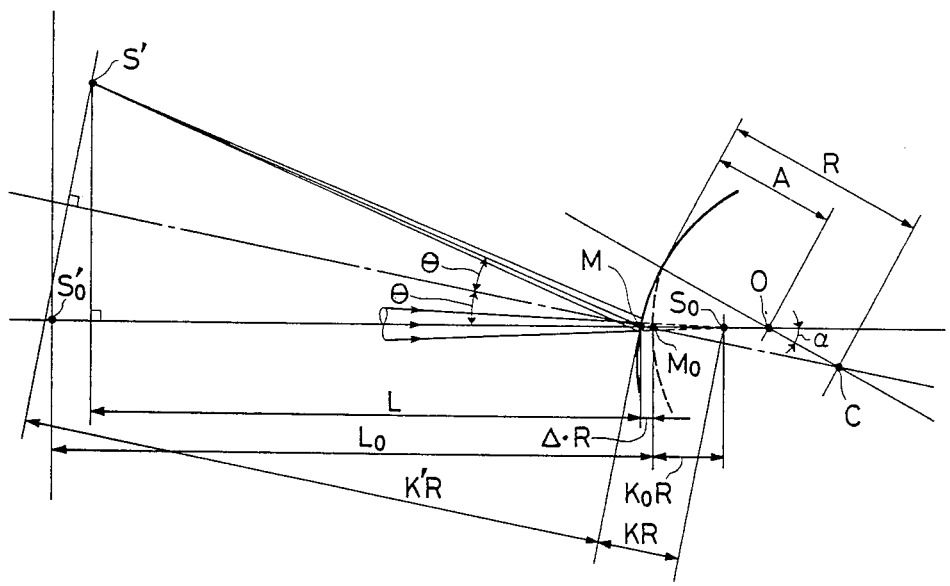
FIG. 2 is a view for explanation of the principle of the post-objective type optical deflection apparatus in accordance with the invention.

A printer optical system using a semiconductor laser is shown as one embodiment of a scanning apparatus which satisfying the aforementioned condition in FIG. 3. FIG. 3(a) illustrates an optical arrangement within a surface in a sub-scanning direction, and FIG. 3(b) illustrates an optical arrangement within a surface in a scanning direction.

The system comprises a semiconductor laser 1 as a light source, a coupling lens 2 for converging a laser luminous flux at $S_o$, a first cylindrical lens 3 having a refracting power within the surface in the sub-scanning direction, a polygonal mirror 4, a second cylindrical lens 5 having a refracting power within said surface, and a photosensitive member 6.

The luminous fluxes from the laser light source 1 are condensed so as to be converged at the point $S_o$ by the coupling lens 2 and incident on the first cylindrical lens 3, and the fluxes in the surface having the refracting power thereof are converged in the neighbourhood of the deflector 4. On the other hand, in the surface including scanning lines, the fluxes are converged toward the point $S_o$ without modification. The polygonal mirror 4 rotates about the axis O to deflect the laser luminous fluxes incident thereupon, which are converged on the photosensitive member 6 by means of the second cylindrical lens 5 for scanning.

The cylindrical lens 5 is arranged so that a deflection point 4' and a scanning surface on the photosensitive member 6 are conjugated geometrical-optially within the surface vertical to the scanning line to correct an unevenness of pitch in the scanning line and a curve of the scanning line and reduce curves of a sagittal image surface (an image surface in a direction along the scanning line).

When the second cylindrical lens is used, the curve $\Delta L_s$ of the sagittal image surface is represented by $$\Delta L_s = \left[ \frac{1}{\{n_c/(n_c - 1)l_o\} \{(\cos 2\theta'/\cos 2\theta) - 1\} + 1} - 1 \right] \quad (5)$$

where $x_o = (1 - l_o)L_o$, $x_o$ is the distance between the cylinder surface and the photosensitive body, $l_o$ is the coefficient representing the position of the cylindrical lens 5, and $n_c$ is the refractive index of the second cylindrical lens. From the Snell's law, we get $\sin 2\theta = n_c \sin 2\theta'$.

In the following, examples of numerical values in the optical systems in the present embodiments and those of prior art will be given.

EXAMPLE 1

Deflection angle: ±32.2955°  (Corresponding $\alpha$: ±18°)
$Y_o$ = 194.71 mm    $L_o$ = 154.71 mm
$R$ = 120 mm    $A$ = 12 mm

| Rotational angle $\alpha$ | Deflection angle $2\theta$ | $\Delta L_M$ (mm) | $\Delta L_s$ (mm) | Linearity (%) |
|---|---|---|---|---|
| 0° | 0 | 0 | 0 | −10.521 |
| 4 | 7.19889 | −0.068 | −0.170 | −10.098 |
| 8 | 14.39106 | −0.238 | −0.698 | −8.780 |
| 12 | 21.56958 | −0.401 | −1.631 | −6.395 |
| 16 | 28.72710 | −0.396 | −3.040 | −2.602 |
| 19 | 32.29550 | −0.124 | −3.984 | 0 |

The second cylindrical lens 5 is:

$f_c$ = 27 mm    $n_c$ = 1.5

Thus, in Equation 5, $x_o$ = 30 mm, $l_o$ = 0.9. Values in prior art corresponding thereto are as follows:

| Rotational angle $\alpha$ | $\Delta L_M = \Delta L_s$ (mm) |
|---|---|
| 0 | 0 |
| 4 | −1.506 |
| 8 | −5.993 |
| 12 | −13.375 |
| 16 | −23.508 |
| 20 | −36.194 |

$L_o$ = 154.71 mm

EXAMPLE 2

Deflection angle: ±21.916°  (Corresponding $\alpha$: ±16°)
$Y_o$ = 209.28 mm    $L_o$ = 188.5 mm
$R$ = 140 mm    $A$ = 12 mm

| Rotational angle $\alpha$ | Deflection angle $2\theta$ | $\Delta L_M$ (mm) | $\Delta L_s$ (mm) | Linearity (%) |
|---|---|---|---|---|
| 0 | 0° | 0 | 0 | −8.26 |
| 2 | 3.65702 | −0.027 | −0.078 | −8.15 |
| 4 | 7.31331 | −0.107 | −0.260 | −7.82 |
| 6 | 10.96813 | −0.231 | −0.586 | −7.26 |
| 8 | 14.62072 | −0.386 | −1.045 | −6.45 |
| 10 | 18.27033 | −0.551 | −1.642 | −5.69 |
| 12 | 21.91615 | −0.697 | −2.385 | −3.97 |
| 14 | 25.55737 | −0.788 | −3.288 | −2.20 |
| 16 | 29.19312 | −0.773 | −4.651 | 0 |

The second cylindrical lens is $f_c$ = 28.5 mm    $n_c$ = 1.5

Thus, in Equation 5, $x_o$ = 30 mm $l_o$ = 0.95. Values in prior art corresponding thereto are as follows:

| Rotational angle α | ΔL_M = L_s (mm) |
|---|---|
| 0° | 0 |
| 2 | −0.459 |
| 4 | −1.834 |
| 6 | −4.119 |
| 8 | −7.302 |
| 10 | −11.368 |
| 12 | −16.297 |

L_o = 188.5 mm

EXAMPLE 3

Deflection angle: ±28.94011°  (Corresponding α: ±16°)
Y_o = 219.11 mm   L_o = 200 mm
R = 149.243 mm    A = 14.924 mm

| Rotational angle α | Deflection angle 2θ | ΔLM (mm) | ΔLs (mm) | Linearity (%) |
|---|---|---|---|---|
| 0 | 0° | 0 | 0 | −8.60 |
| 2 | 3.59986 | −0.011 | −0.020 | −8.48 |
| 4 | 7.19889 | −0.041 | −0.120 | −8.14 |
| 6 | 10.79624 | −0.081 | −0.476 | −7.56 |
| 8 | 14.39106 | −0.115 | −1.057 | −6.71 |
| 10 | 17.98247 | −0.120 | −1.843 | −5.58 |
| 12 | 21.56958 | −0.064 | −2.809 | −4.12 |
| 14 | 25.15145 | −0.097 | −3.926 | −2.29 |
| 16 | 28.72710 | 0.421 | −5.475 | 0 |

The decrease in the curvature of field in accordance with the present invention is specifically shown in Examples 1 and 2, and the deviation in the image surface is given in the following table.

| | Meridional image surface | Sagittal image surface |
|---|---|---|
| Example 1 | Above 80 times | Above 5 times |
| Example 2 | Above 380 times | Above 11 times |

As described above, the present invention can provide an optical deflection apparatus which can properly correct the curvature of field, can restrain the fθ characteristic to a level less than 10 to 15%, which can be corrected, by modifying timing of an image signal, and can correct falling of the polygonal mirror.

While in the aforementioned examples, the semiconductor laser has been used as a light source, it is to be understood that a gas laser 1' and a modulation optical system 2' may be used as shown in FIG. 4. As is well known, the modulation optical system 2' comprises an optical modulation element 2'-2, a stop lens 2'-1 and a convergent lens 2'-3. For the laser display, a reflection or transmission screen may be installed at the position of the photosensitive member. In addition, in the above-described examples, the cylindrical lens has been used as the optical element for placing the deflection surface and scanning surface in the geometrical-optically conjugated relation within the surface in the sub-scanning direction. The improvement in the aforesaid fθ characteristic is intended for the surface in the main scanning direction. Therefore, even if other known anamorphic optical elements are used as the optical element for placing the deflection surface and the scanning surface in the geometrical-optically conjugated relation, exactly the same effect may be obtained without doubt as to the effect of the improvement in the fθ characteristic.

What is claimed is:

1. A post-objective type polygonal optical deflector including mirrors whose reflecting surfaces are convex spherical surfaces or cylindrical surfaces having the radius R, and an anamorphic optical element arranged between said deflector and a scanning surface to place an optical deflection surface and the scanning surface in the geometrical-optically conjugated relation, characterized in that the following relation is met $$A/yo \leq 0.52(R/yo) \cdot (Lo/yo) - 0.1708$$

where
A: Radius of an inscribed circle of the polygonal optical deflector
R: Radius of curvature of the reflecting surfaces of the polygonal optical deflector
Lo: Distance from a deflection point of the polygonal optical deflector to the scanning surface yo: Effective scanning width.

* * * * *